(12) United States Patent
Yamasaki

(10) Patent No.: US 8,077,251 B2
(45) Date of Patent: Dec. 13, 2011

(54) PHOTOMETRY APPARATUS AND CAMERA

(75) Inventor: Ryo Yamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 393 days.

(21) Appl. No.: 11/870,120

(22) Filed: Oct. 10, 2007

(65) Prior Publication Data

US 2008/0111991 A1    May 15, 2008

(30) Foreign Application Priority Data

Nov. 9, 2006    (JP) .................... 2006-304411

(51) Int. Cl.
*G03B 13/00* (2006.01)
*H04B 10/00* (2006.01)
*H04J 14/02* (2006.01)
(52) U.S. Cl. ........... 348/350; 348/345; 398/111; 398/89
(58) Field of Classification Search .................. 348/345, 348/349, 350; 396/89, 111, 112, 115, 121, 396/122, 123
See application file for complete search history.

(56) References Cited

U.S. PATENT DOCUMENTS

| | | | |
|---|---|---|---|
| 4,482,230 A * | 11/1984 | Magariyama et al. | 396/384 |
| 4,623,932 A * | 11/1986 | Inoue et al. | 348/350 |
| 5,589,908 A * | 12/1996 | Irie | 396/51 |
| 7,515,199 B2 * | 4/2009 | Kawai et al. | 348/347 |
| 2002/0006281 A1 * | 1/2002 | Owada | 396/104 |
| 2004/0004670 A1 * | 1/2004 | Yamashita | 348/345 |

FOREIGN PATENT DOCUMENTS

| | | |
|---|---|---|
| JP | 01-045883 | 10/1989 |
| JP | 3363683 | 10/2002 |
| JP | 2006-146081 A | 6/2006 |
| JP | 2006-261928 A | 9/2006 |

OTHER PUBLICATIONS

The above references were cited in a Oct. 11, 2011 Japanese Office Action, which is enclosed without English Translation, that issued in Japanese Patent Application No. 2006-304411.

* cited by examiner

*Primary Examiner* — Sinh Tran
*Assistant Examiner* — Mark Monk
(74) *Attorney, Agent, or Firm* — Cowan, Liebowitz & Latman, P.C.

(57) ABSTRACT

This invention allows measuring the spectral state of an object more accurately even at low luminance, and implementing high-precision focus detection. A photometry apparatus includes a diffusing optical member which is inserted in the optical path of a photographing lens and has a diffusing surface, and a light unit which receives diffused light having passed through the diffusing surface, and has a first light receiving portion, and a second light receiving portion whose receivable light energy is smaller than that of the first light receiving portion. The first and second light receiving portions are so arranged as to make the parallax of the second light receiving portion with respect to the optical axis of the photographing lens smaller than that of the first light receiving portion.

7 Claims, 13 Drawing Sheets

PHOTOMETRY APPARATUS AND CAMERA

BACKGROUND OF THE INVENTION

1. Field of the Invention

The present invention relates to a photometry technique of measuring the optical characteristics of an object in a digital camera, video camera, silver halide camera, or the like.

2. Description of the Related Art

Conventionally, a quick return mirror is inserted into the optical path of a photographing lens for TTL type focus detection. The quick return mirror comprises a main mirror having a semi-transmitting portion, and a sub-mirror positioned behind it. The focus is detected using a light beam which has passed through the main mirror and is deflected by the sub-mirror. In photography after focus detection, the quick return mirror is retracted from the optical path of the photographing lens.

In this focus detection, an actual image sensing plane is different from a focus detection plane, so a focus detection error readily occurs under the influence of a manufacturing error, object characteristics, and the like. For example, if the spectral characteristics of detected light differ between the image sensing plane and the focus detection plane, a focus detection error may occur depending on the spectral characteristics of the object.

This is because the aberrations of a photographing lens are corrected in the visible light region but not corrected for infrared light. Hence, a focus detection error arises from the difference in spectral characteristics between the image sensing plane and the focus detection plane in the infrared region. The image sensing plane of a general camera has spectral characteristics of receiving only visible light. To cope with this, the focus detection plane needs to have the same spectral characteristics as those of the image sensing plane by arranging an infrared cut filter in front of a light receiving unit.

Most cameras detect a focus by projecting a predetermined pattern to an object by auxiliary light and detecting the pattern, in order to detect the focus at low luminance. At this time, the auxiliary light source is an infrared light source using a dominant wavelength of around 700 nm close to visible light so that the object does not feel that auxiliary light is too bright. If the focus detection plane has the same spectral characteristics as those of the image sensing plane, as described above, it cannot receive infrared auxiliary light. Thus, the spectral range of the focus detection plane must be widened by the infrared light source range from that of the image sensing plane. However, a focus detection error occurs if the spectral characteristics differ between the image sensing plane and the focus detection plane.

To solve this, there has conventionally been known a technique of storing the correction amounts of the image sensing plane and focus detection plane in advance, and correcting a focus detection result. However, this correction assumes an object having normal spectral characteristics. A focus detection error occurs for an object under a light source such as a fluorescent light having unique spectral characteristics.

From this, Japanese Patent Publication No. 1-45883 discloses a light receiving apparatus which detects the spectral state of an object and corrects a focus detection result.

FIG. 12 is a sectional view showing the arrangement of a conventional light receiving apparatus. FIG. 13 is a perspective view showing the light receiving apparatus.

The image of an object 21 is formed on a light receiving apparatus 23 via a photographing lens 22. A quick return mirror (not shown) is interposed between the photographing lens 22 and the light receiving apparatus 23. The quick return mirror distributes a light beam having passed through the photographing lens 22 into light beams to the image sensing plane (not shown) and the light receiving apparatus 23.

The light receiving apparatus 23 comprises an optical path split prism 26 having a semi-transmitting surface 24 and total reflection surface 25, and first and second light receiving element arrays 28 and 29 formed on a board 27. With this arrangement, the image of the same portion of the object 21 is formed on the light receiving element arrays 28 and 29 to detect the focus of the photographing lens 22 by a known phase difference detection method.

Light beams having all wavelengths can enter the first and second light receiving element arrays 28 and 29. First and second auxiliary light receiving elements 30 and 31 are arranged on the board 27, as shown in FIG. 13. The auxiliary light receiving elements 30 and 31 respectively support an infrared cut filter 32 which transmits visible light (400 to 650 nm) and cuts infrared light, and an infrared transmitting filter 33 which transmits near infrared light (700 to 800 nm) and cuts visible light. The auxiliary light receiving elements 30 and 31 separately output signals representing the quantities of visible light and near infrared light contained in a light beam from the photographing lens 22.

Focus detection results obtained by the light receiving element arrays 28 and 29 are corrected based on the ratio of signals detected by the auxiliary light receiving elements 30 and 31. This enables focus detection under all light sources.

However, this prior art suffers the following problems.

Since the light receiving element arrays 28 and 29 and the auxiliary light receiving elements 30 and 31 are arranged on the focus detection board 27, this unit that different positions of an object are measured. When correcting a detected focus, the accurate spectral state of a position of the object cannot be obtained. The light receiving ranges of an object by the auxiliary light receiving elements 30 and 31 are very small and influenced by a partial object.

When many focus detection regions are set at high density in a wide photographing range, as disclosed in Japanese Patent No. 3363683, many light receiving element arrays 28 and 29 are formed at high density on the focus detection board 27. There is no space to arrange the auxiliary light receiving elements 30 and 31.

Further, when a camera has a TTL viewfinder, like a single-lens reflex camera, light guided to the focus detection system is dark because it has passed through the half-mirror. Since the auxiliary light receiving elements 30 and 31 are very small, it is difficult to detect the spectral state of an object at low luminance.

SUMMARY OF THE INVENTION

The present invention has been made to overcome the conventional drawbacks, and has as its object to allow measuring the spectral state of an object more accurately than in the prior art even at low luminance.

In order to solve the above problems and to achieve the above object, according to the first aspect of the present invention, there is provided a photometry apparatus comprising a diffusing optical member which is inserted into an optical path of a photographing lens and has a diffusing surface, and a light receiving unit configured to receive diffused light having passed through the diffusing surface, the light receiving unit configured to have a first light receiving portion, and a second light receiving portion whose receivable light energy is smaller than a receivable light energy of the first light receiving portion, wherein the first light receiving portion and the second light receiving portion are so arranged as to make a parallax of the second light receiving portion with respect to an optical axis of the photographing lens smaller than a parallax of the first light receiving portion.

According to the second aspect of the present invention, there is provided a camera comprising a diffusing optical member which is inserted into an optical path of a photographing lens and has a diffusing surface, and a light receiving unit configured to receive diffused light having passed through the diffusing surface, the light receiving unit configured to have a first light receiving portion, and a second light receiving portion whose receivable light energy is smaller than a receivable light energy of the first light receiving portion, wherein the first light receiving portion and the second light receiving portion are arranged so as to make a parallax of the second light receiving portion with respect to an optical axis of the photographing lens smaller than a parallax of the first light receiving portion.

Further features of the present invention will become apparent from the following description of exemplary embodiments with reference to the attached drawings.

DESCRIPTION OF THE EMBODIMENT

An embodiment in which the present invention is applied to a single-lens reflex type digital camera will be described in detail below with reference to the accompanying drawings.

Figure 1:
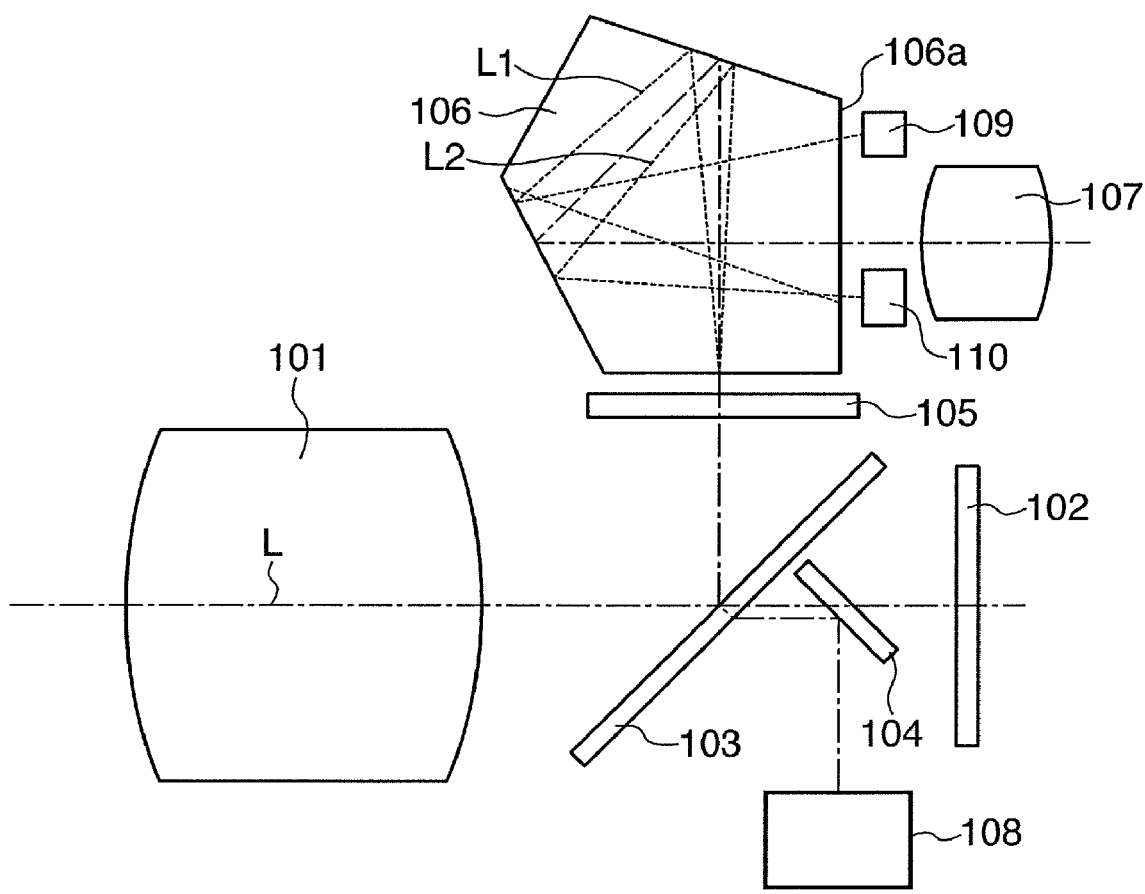
FIG. 1 is a center sectional view showing the main part of an optical system in a digital camera according to an embodiment.

FIG. 1 is a center sectional view showing the main part of an optical system in a digital camera according to an embodiment.

In FIG. 1, a photographing lens 101 has an optical axis L indicated by a chain line. An image sensor unit 102 including an optical low-pass filter, infrared cut filter, and image sensor is arranged near the image sensing plane serving as the expected imaging plane of the photographing lens 101. The image sensor unit 102 converts a light beam (object image) imaged by the photographing lens 101 into an electrical signal, and performs an image sensing operation. A main mirror 103 and sub-mirror 104 are interposed between the photographing lens 101 and the image sensor unit 102. In photography, the main mirror 103 and sub-mirror 104 are retracted from the optical path of a photographing light beam by a known quick return mechanism (not shown). Part of the main mirror 103 is formed from a half-mirror, and a light beam having passed through the photographing lens 101 is split into reflected light to be guided to an upper viewfinder optical system and transmitted light to enter the sub-mirror 104. The reflected light is formed into an image on the diffusing surface of a focusing screen 105 (diffusing optical member) having the diffusing surface as one surface and a Fresnel surface as the other surface. The image is guided to an observer's eye via a pentaprism 106 and eyepiece lens group 107. The transmitted light changes its optical path downward via the sub-mirror 104, and is guided to a focus detection device 108 which detects the focusing state of the photographing lens 101.

In the viewfinder optical system, a known exposure photometry device 109 for controlling the camera exposure, and a focus detection photometry device 110 are arranged on the side of an exit surface 106a of the pentaprism 106. These two photometry devices receive a light beam diffused by the diffusing surface of the focusing screen 105. L1 and L2 represent the axes of light beams entering the centers of these photometry devices from the center of the diffusing surface of the focusing screen 105, that is, the intersection point between the diffusing surface and the optical axis L. The exposure photometry device 109 receives a light component diffused from the center of the diffusing surface by an angle defined by the optical axes L and L1. To the contrary, the focus detection photometry device 110 receives a light component diffused by an angle defined by the optical axes L and L2. In FIG. 1, the angle defined by the optical axis L for the focus detection photometry device 110 is smaller than that for the exposure photometry device 109. In practice, the angle defined by the optical axis L for the focus detection photometry device 110 is larger than that for the exposure photometry device 109 because the focus detection photometry device 110 is set back to the far side from the sheet surface of FIG. 1.

Figure 2:
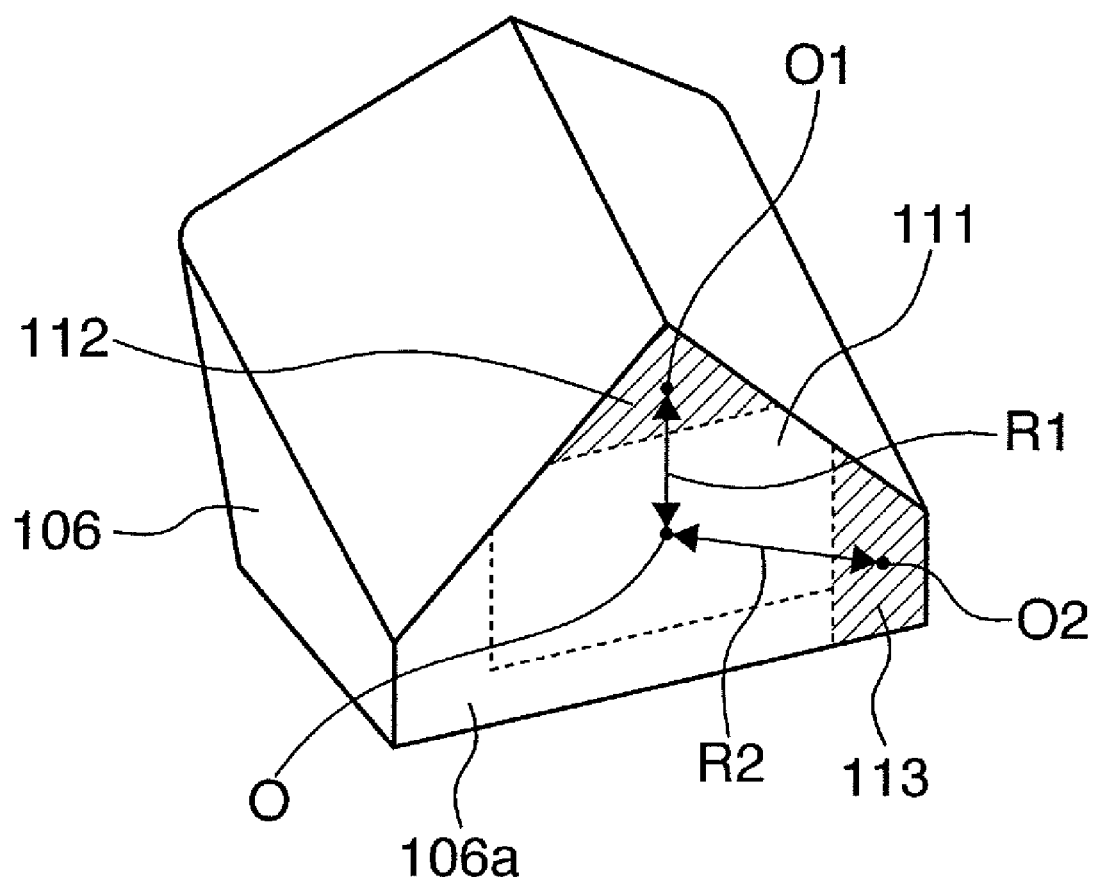
FIG. 2 is a perspective view showing the exit surface of a pentaprism when viewed from obliquely above.

FIG. 2 is a perspective view showing the exit surface 106a of the pentaprism 106 when viewed from obliquely above.

In FIG. 2, a light beam guided to an observer's eye via the eyepiece lens group 107 passes through a region 111 surrounded by a chain double-dashed line on the exit surface 106a. A point O is the intersection point between the optical axis L of a light beam reflected by the main mirror 103, that is, the optical axis of the eyepiece lens group 107 and the exit surface 106a.

A light beam guided to the exposure photometry device 109 passes through a hatched region 112 in FIG. 2. A point O1 is the intersection point between the exit surface 106a and the optical axis L1 of a light beam diffused by the diffusing surface of the focusing screen 105. A hatched region 113 on the exit surface 106a is used for the focus detection photometry device 110. A point O2 is the intersection point between the exit surface 106a and the optical axis L2 of a light beam diffused by the diffusing surface of the focusing screen 105.

The exposure photometry device 109 measures a light beam from the diffusing surface of the focusing screen 105 at a position on the exit surface 106a that is shifted by R1 in the vertical direction from the point O corresponding to the light axis of the eyepiece lens group 107. Similarly, the focus detection photometry device 110 measures a light beam from the diffusing surface of the focusing screen 105 at a position shifted by a distance R2 from the point O.

Figure 3:
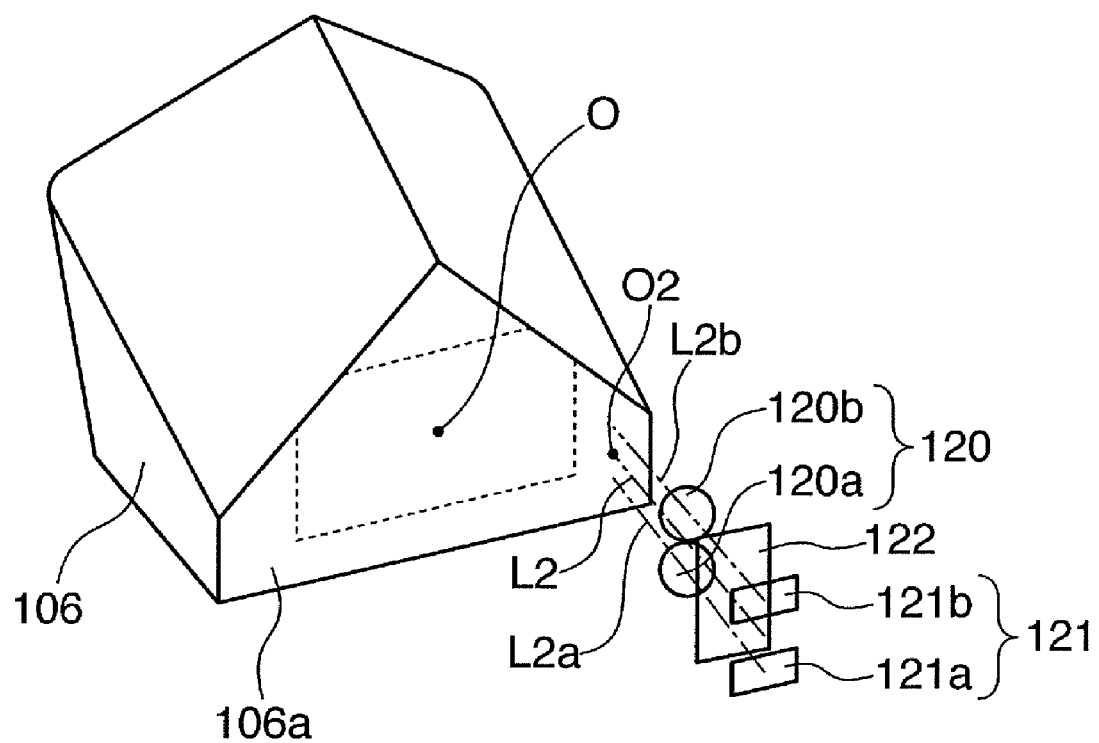
FIG. 3 is a perspective view showing the main elements of a focus detection photometry device in addition to the perspective view of FIG. 2.

FIG. 3 is a perspective view showing the main elements of the focus detection photometry device 110 in addition to the perspective view of FIG. 2.

In FIG. 3, the focus detection photometry device 110 comprises a lens unit 120 having a pair of lenses 120a and 120b, and a light receiving unit 121 having a pair of first and second light receiving portions 121a and 121b. The lens 120a guides, onto the first light receiving portion 121a, light having passed through a predetermined region on the diffusing surface of the focusing screen 105. Similarly, the lens 120b corresponds to the second light receiving portion 121b.

As shown in FIG. 3, the optical axis L2 of the above-described focus detection photometry device 110 extends through the centers of the lens unit 120 and light receiving unit 121. In practice, an optical axis L2a corresponds to the lens 120a and first light receiving portion 121a, and an optical axis L2b corresponds to the lens 120b and second light receiving portion 121b. The optical axes L2a and L2b are set to substantially cross each other on the diffusing surface of the focusing screen 105. Hence, the first and second light receiving portions 121a and 121b have parallaxes with respect to the optical axis L. The first and second light receiving portions 121a and 121b receive object images formed with a parallax on the diffusing surface.

An optical filter 122 is interposed between the lens unit 120 and the light receiving unit 121. The optical filter 122 mainly cuts wavelengths in the infrared region unnecessary for detection. An on-chip filter (not shown) is formed on the surface of the second light receiving portion 121b. To the contrary, the first light receiving portion 121a transmits all light components. Thus, the first and second light receiving portions 121a and 121b have different spectral transmission characteristics. By detecting the difference between the first and second light receiving portions 121a and 121b, the focus detection result of the focus detection device 108 is corrected in accordance with the spectral characteristics of an object. Details of this process will be described later. The first and second light receiving portions 121a and 121b are spaced apart from each other in FIG. 3 for illustrative convenience, but are formed on the same element in practice. The field of view of the viewfinder in an optical path extending to the viewfinder is almost rectangular, and the first and second light receiving portions are arranged so as to receive diffused light outside an effective light beam along the short side of the rectangle.

Figure 4:
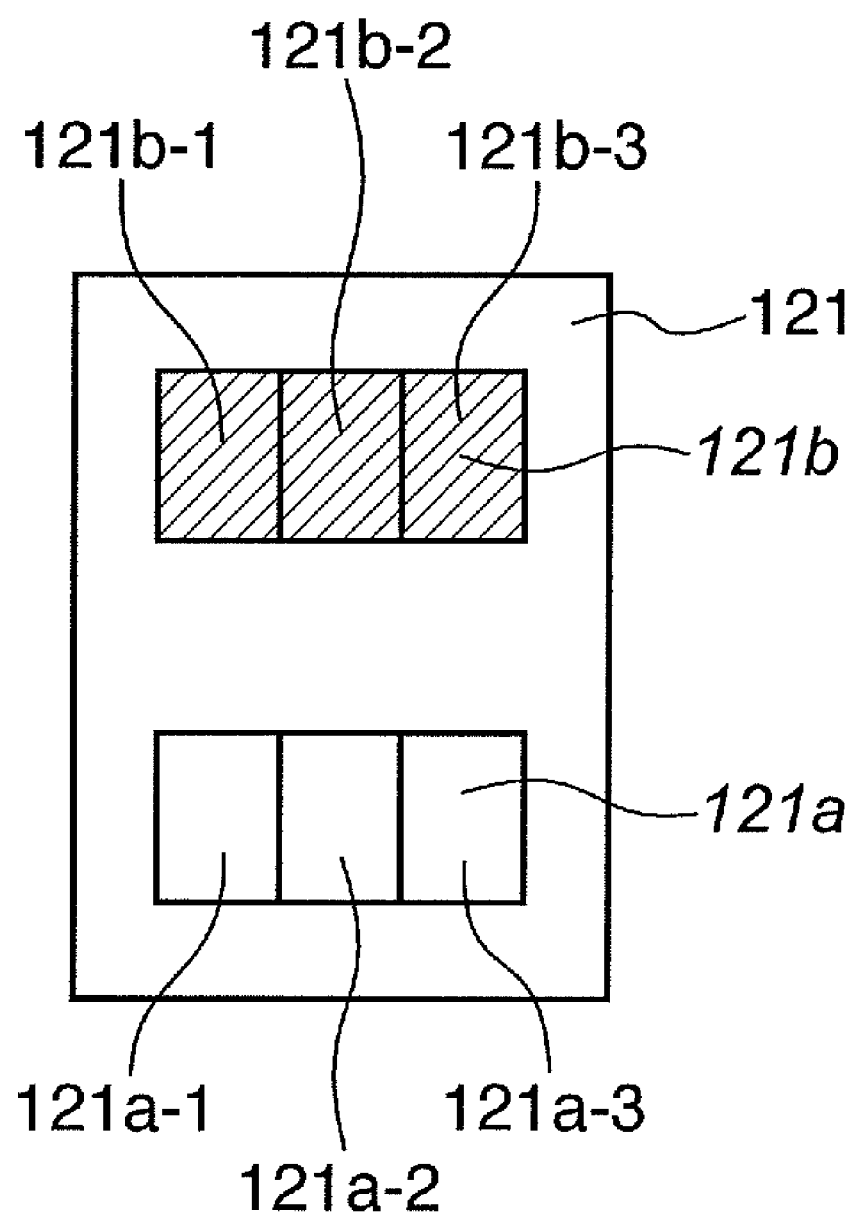
FIG. 4 is a plan view showing a light receiving unit when viewed from the pentaprism.

FIG. 4 is a plan view showing the light receiving unit 121 when viewed from the pentaprism 106 in order to explain the arrangement of the first and second light receiving portions. In FIG. 4, the light receiving portion 121a is divided into three light receiving regions 121a-1, 121a-2, and 121a-3. The light receiving portion 121b is also divided into three light receiving regions 121b-1, 121b-2, and 121b-3. These light receiving portions are formed on the same element. The light receiving portion 121b is hatched in FIG. 4 in order to represent that it has an on-chip filter.

Figure 5:
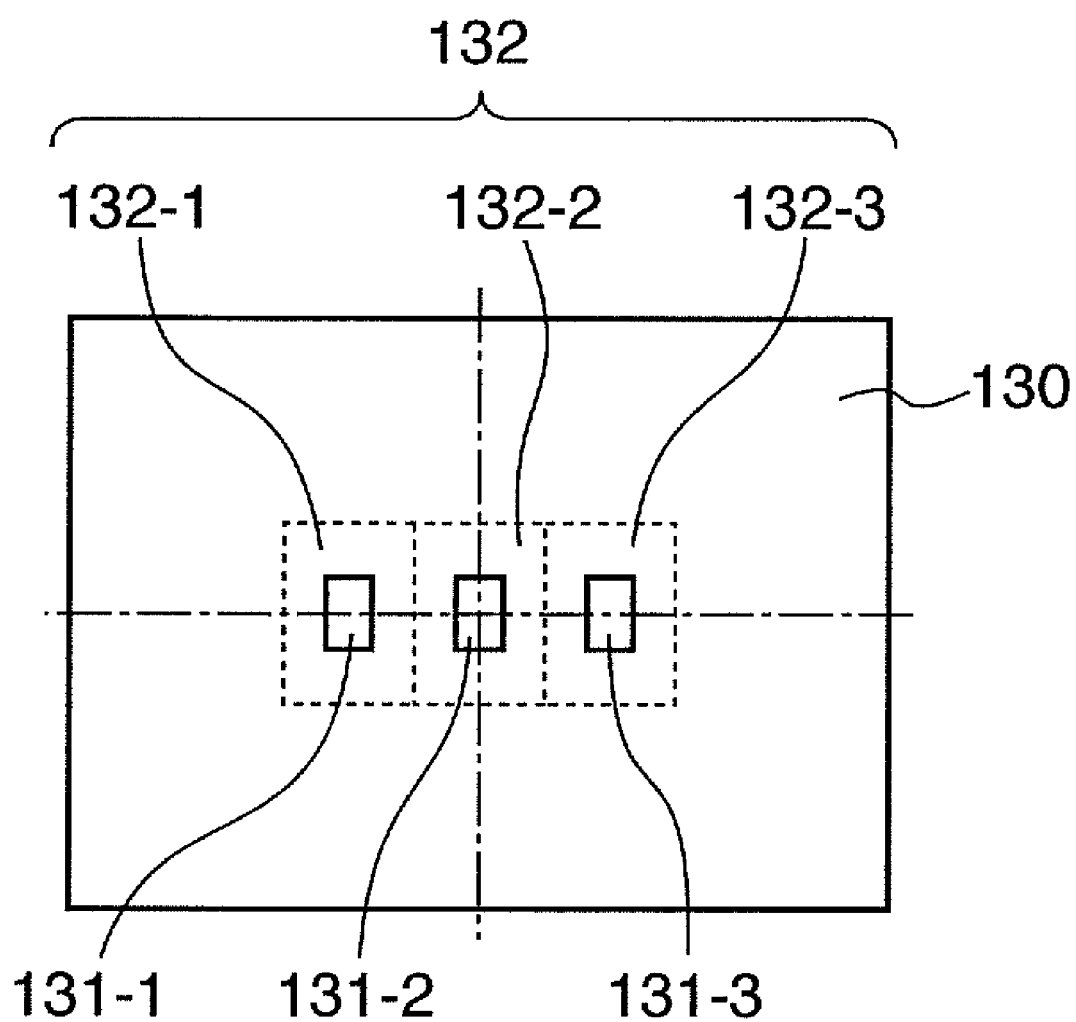
FIG. 5 is a plan view showing the detection regions of a focus detection device and photometry device on the diffusing surface of a focusing screen.

FIG. 5 is a plan view showing the detection regions of the focus detection device 108 and focus detection photometry device 110 on the diffusing surface of the focusing screen 105. In FIG. 5, a visual field 130 is sensed by the image sensor unit 102. The focus detection device 108 can adjust the focus of the photographing lens 101 in focus detection regions 131-1, 131-2, and 131-3. In the embodiment, the focus detection region is of a multipoint type having three focus detection regions. A light receiving region 132 indicated by a dotted line in FIG. 5 represents the first and second light receiving portions 121a and 121b in FIG. 3 which are projected back onto the diffusing surface. The optical system is set so that the first and second light receiving portions 121a and 121b receive light from the same region on the focusing screen 105. Thus, the regions of the first and second light receiving portions 121a and 121b coincide with each other and overlap each other.

The light receiving region 132 is divided into three light receiving regions 132-1, 132-2, and 132-3, which correspond to the three focus detection regions 131-1, 131-2, and 131-3, respectively. The light receiving regions 132-1, 132-2, and 132-3 represent the three light receiving regions 121a-1, 121a-2, and 121a-3 and the three light receiving regions 121b-1, 121b-2, and 121b-3 described with reference to FIG. 4. Since each focus detection region corresponds to a light receiving region, this enables photometry corresponding to each focus detection region.

Figure 6:
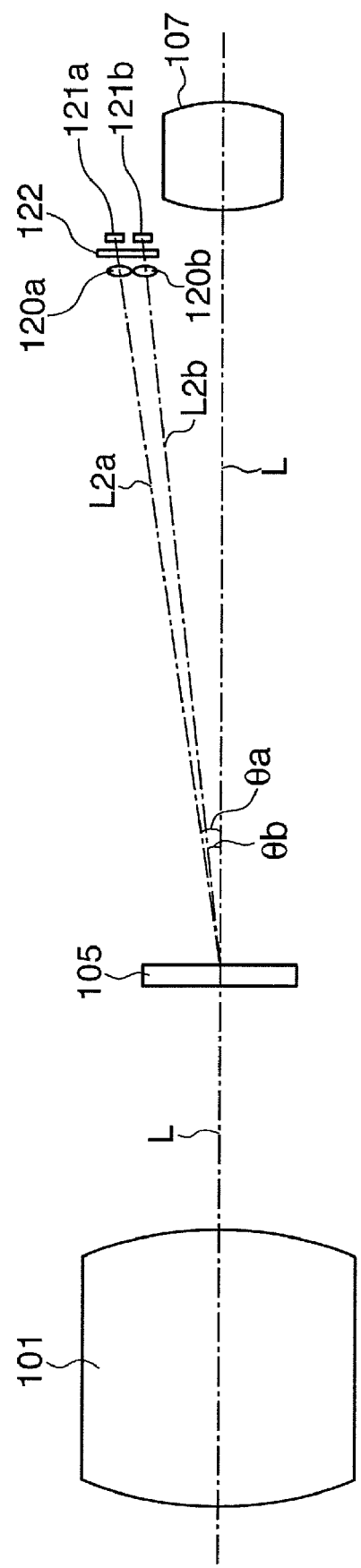
FIG. 6 is a linearly exploded view showing the optical system in FIG. 1.

FIG. 6 is a linearly exploded view showing the optical system in FIG. 1 from which the pentaprism 106 is omitted. Since the pentaprism 106 is not illustrated, the optical path length is adjusted by converting the medium of the pentaprism 106 into air. FIG. 6 is, therefore, optically equivalent to FIG. 1.

As shown in FIG. 6, the first and second light receiving portions 121a and 121b receive light from the diffusing surface of the focusing screen 105 with parallaxes of angles θa and θb with respect to the optical axis L of the photographing lens. In this state, the first and second light receiving portions 121a and 121b receive light from the focusing screen 105 while the parallax of the first light receiving portion 121a is larger than that of the second light receiving portion 121b.

Figure 7:
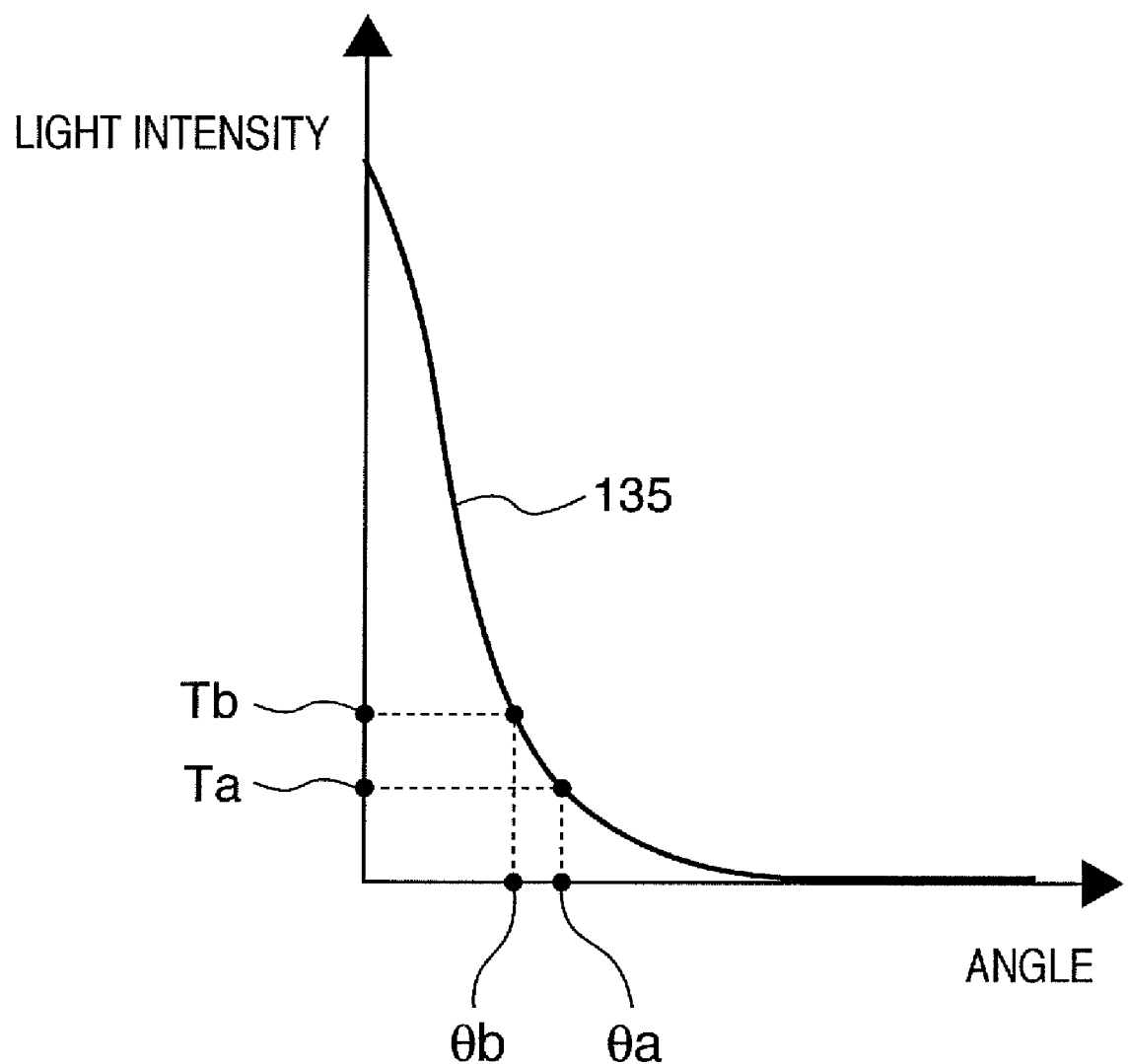
FIG. 7 is a graph showing the diffusion characteristic of light perpendicularly incident on the focusing screen.

FIG. 7 is a graph showing the diffusion characteristic of light perpendicularly entering the focusing screen 105.

In the graph of FIG. 7, the abscissa axis represents the angle of diffused light, and the ordinate axis represents the light intensity at the angle. A curve 135 represents the diffusion characteristic of the focusing screen 105. Angles θa and θb are equal to those shown in FIG. 6, and Ta and Tb represent light intensities at the angles θa and θb. Assuming that the on-chip filter on the second light receiving portion 121b is ignored, if a light beam having the optical axis L perpendicularly enters the focusing screen 105, the first light receiving portion 121a receives light having the intensity Ta, and the second light receiving portion 121b receives light having the intensity Tb. This unit that the second light receiving portion 121b receives light having a higher intensity. In practice, the light intensity is not simply determined because the light receiving portion has a two-dimensional shape and the angle of a light beam incident on the focusing screen 105 from the photographing lens 101 varies. However, the quantity of light entering the second light receiving portion 121b is always larger than that entering the first light receiving portion 121a.

Figure 8:
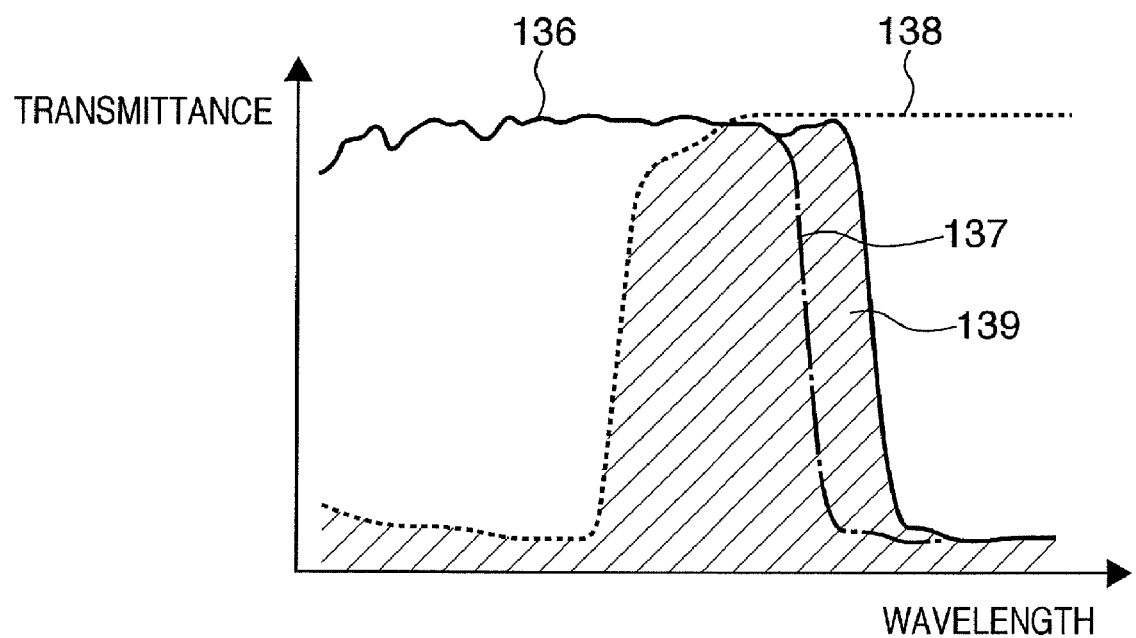
FIG. 8 is a graph showing the spectral transmittance of each filter.

FIG. 8 is a graph showing the spectral transmittance of each filter.

In FIG. 8, the abscissa axis represents the wavelength of light, and the ordinate axis represents the filter transmittance at the wavelength. The optical filter 122 has a spectral transmittance 136, which is almost equal to that of the focus detection device 108. The image sensor unit 102 has a spectral transmittance 137 indicated by a chain double-dashed line in FIG. 8, and transmits only visible light. The spectral transmittance 136 of the optical filter 122 is set to transmit light having a longer wavelength (toward near infrared light) as compared with the spectral transmittance 137 because of the reason described in Description of the Related Art.

The on-chip filter on the second light receiving portion 121b has a spectral transmittance 138 indicated by a dotted line in FIG. 8. The on-chip filter transmits only light having a longer wavelength in comparison with the spectral transmittance 136.

With these spectral transmittances, the first light receiving portion 121a having no on-chip filter receives light represented by the spectral transmittance 136. The second light receiving portion 121b receives light falling within a hatched region 139 where the spectral transmittances 136 and 138 overlap each other.

Figure 9:
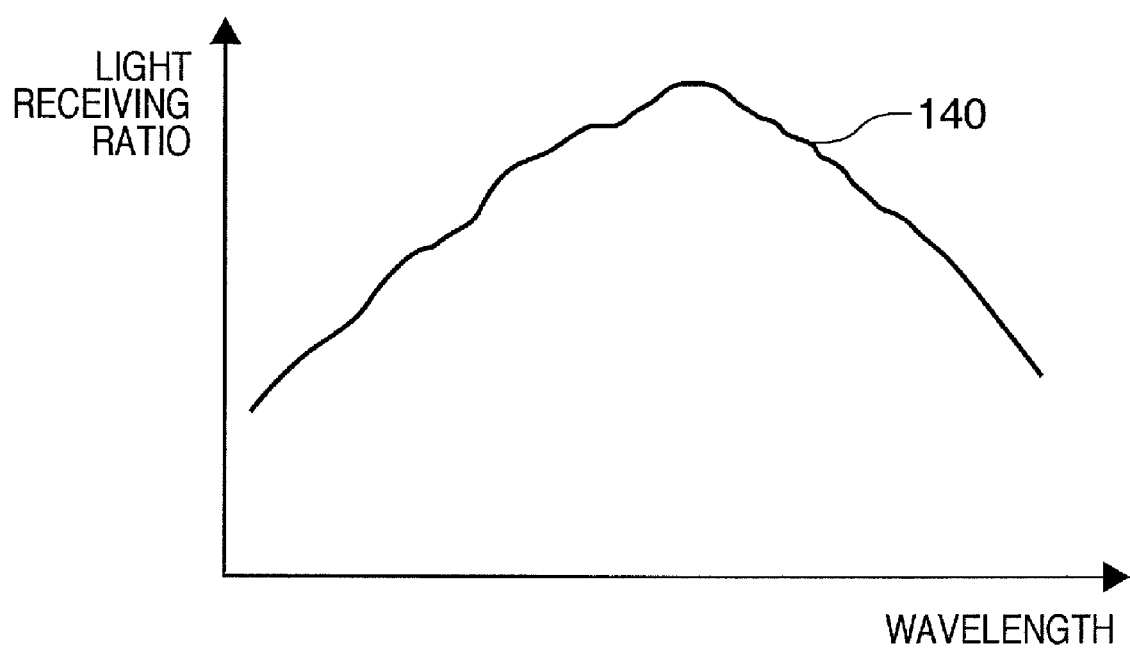
FIG. 9 is a graph showing the spectral characteristic of a light receiving unit 121.

FIG. 9 is a graph showing the spectral characteristic of the light receiving unit 121. The abscissa axis represents the wavelength of light, and the ordinate axis represents the strength of an output signal at the wavelength, which will be called the light receiving ratio. The light receiving unit 121 is, for example, a silicon photodiode, and has a peak on the long wavelength side. Both the first and second light receiving portions 121a and 121b have this characteristic. To make their characteristics coincide with each other much more, the first and second light receiving portions 121a and 121b are formed on the same element.

Figure 10:
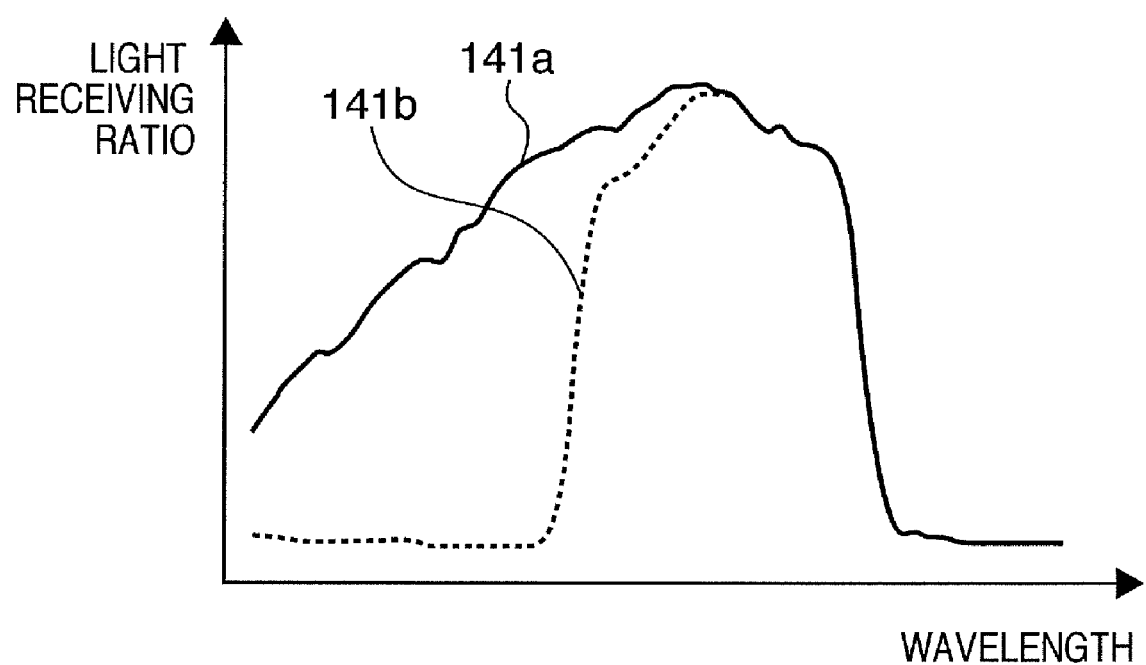
FIG. 10 is a graph showing the light receiving ratio of a light receiving portion.

FIG. 10 shows the final light receiving ratio of the light receiving portion that is derived from the spectral transmittance in FIG. 8 and the light receiving ratio in FIG. 9.

In FIG. 10, a spectral characteristic 141a corresponds to the first light receiving portion 121a, and a spectral characteristic 141b corresponds to the second light receiving portion 121b. This graph reveals that the first light receiving portion 121a receives light including visible light to near infrared light close to visible light, and the second light receiving portion 121b receives light including visible light on the red side to near infrared light close to visible light. Assuming flat light having a constant intensity regardless of the wavelength, the second light receiving portion 121b receives a light energy almost half of that by the first light receiving portion 121a.

From this, according to the embodiment, the second light receiving portion 121b whose receivable light energy is small owing to the spectral characteristic is arranged to have the parallax of the small angle θb with respect to the optical axis L as shown in FIG. 6. The first light receiving portion 121a whose receivable light energy is larger is arranged to have the parallax of the large angle θa with respect to the optical axis L.

This arrangement will be examined in terms of only the center of the visual field 130 shown in FIG. 5. Sa represents an area obtained by integrating the spectral characteristic 141a of the graph shown in FIG. 10, and Sb represents an area obtained by integrating the spectral characteristic 141b. These areas are multiplied by the diffusion characteristic of the focusing screen 105 shown in FIG. 7. The final light quantity of the first light receiving portion 121a is Ta×Sa, and that of the second light receiving portion 121b is Tb×Sb. Since Tb>Ta and Sa>Sb, the second light receiving portion 121b whose receivable light energy is small owing to the spectral characteristic can receive a larger quantity of light because of the diffusion characteristic of the focusing screen 105. In practice, complicated calculation is necessary in accordance with the angle of incident light because each light receiving portion has a two-dimensional shape, as described above. However, the state of each light receiving portion can be estimated even from only the center.

The marginal performance of the light receiving unit 121 at low luminance is determined by the quantity of light entering the light receiving portion and the S/N characteristic. In an arrangement having a pair of light receiving portions, like the embodiment, they receive light for the same accumulation time, so a smaller light quantity determines the marginal performance.

This will be explained in detail.

The S/N (source/noise) ratio of each light receiving portion will be examined on the assumption that the light source emits flat light regardless of the wavelength while ignoring the diffusion characteristic in FIG. 7. As for S in the S/N ratio of each light receiving portion, the first light receiving portion 121a has S=Sa, and the second light receiving portion 121b has S=Sb, as described with reference to FIG. 10. At this time, N=Nc because the first and second light receiving portions 121a and 121b are formed on the same element and N (noise) is constant regardless of the first and second light receiving portions 121a and 121b. The first light receiving portion 121a has N=Nc, and the second light receiving portion 121b also has N=Nc. Hence, as the S/N ratio of each light receiving portion, the first light receiving portion 121a has S/N=Sa/Nc, and the second light receiving portion 121b has S/N=Sb/Nc. The threshold of the marginal performance of the light receiving portion at low luminance is determined in consideration of the linearity of the light receiving portion and the like when N exceeds a predetermined level at given S. That is, when the S/N ratio becomes equal to or lower than a given threshold, the detection operation by the light receiving portion is inhibited, and the performance at that time is determined as marginal performance. Since Sa>Sb, the marginal performance is determined depending on Sb, that is, the second light receiving portion 121b.

The embodiment further improves the marginal performance at low luminance for an object by arranging the second light receiving portion 121b, which determines the marginal performance, at a position where a larger light energy is receivable because of the diffusion characteristic based on the parallax described with reference to FIGS. 6 and 7. When the light receiving portions shown in FIG. 6 are interchanged, the low-luminance performance degrades greatly as a result of multiplying the diffusion characteristic in FIG. 7 and the spectral characteristic in FIG. 8. The above description assumes a flat light source, but is also applicable to other light sources. As for a special light source which exhibits a spectrum intensity in only the infrared to near infrared regions, like infrared auxiliary light, the light receiving portion 121a determines the marginal performance. In this case, the present invention need not be applied because the camera stores in advance in-focus positional error information for infrared auxiliary light and corrects the in-focus positional error, as is well known.

In the embodiment, the focus detection photometry device 110 is arranged not on the side of the focus detection device 108 which uses a light beam from the photographing lens 101 by reducing it, but on the side of the viewfinder optical system. This allows measuring a larger light quantity. The marginal performance at low luminance improves in comparison with the prior art.

With the above-described arrangement, the focus detection photometry device 110 can detect the light quantity of near infrared light close to visible light from an object captured by the photographing lens 101. In general, only the chromatic aberration of the photographing lens 101 is corrected for visible light centered on the D line (589 nm), and is not corrected for near infrared light and light having a longer wavelength. As described in Description of the Related Art and FIG. 8, the focus detection device 108 detects a focus up to the uncorrected near infrared region. As described with reference to FIG. 8, the image sensor unit 102 receives only visible light. Thus, the in-focus position of the photographing lens 101 and the detection result of the focus detection device 108 are adjusted in advance in consideration of the fact that up to near infrared light enters the focus detection device 108.

However, when an object is photographed under a light source such as a fluorescent light having no long wavelength components subsequent to near infrared light, the in-focus position shifts adversely because the adjustment considers even near infrared light, as described above. To prevent this, the in-focus position of the photographing lens 101 is corrected from the difference between the light receiving output values of the first and second light receiving portions 121*a* and 121*b* under a variety of light sources by using, as a reference, a light source when the in-focus position is adjusted in advance.

Figure 11:
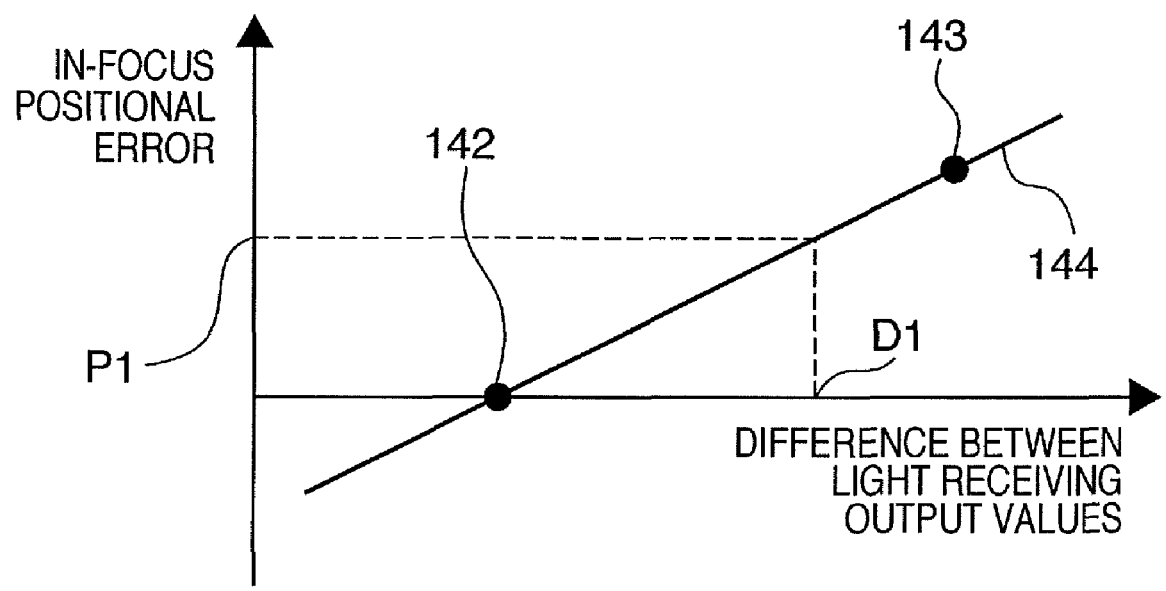
FIG. 11 is a graph showing the relationship between the difference between light receiving output values, and the in-focus positional error of a photographing lens.
Figure 12:
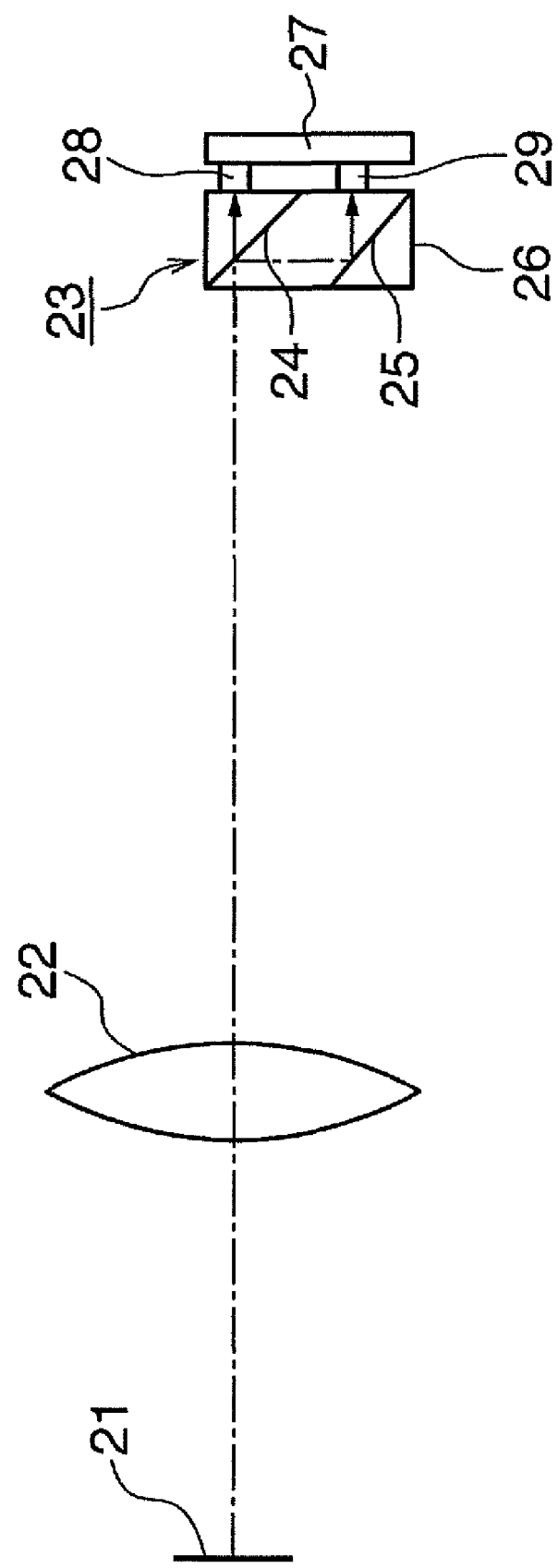
FIG. 12 is a sectional view for explaining a prior art.
Figure 13:
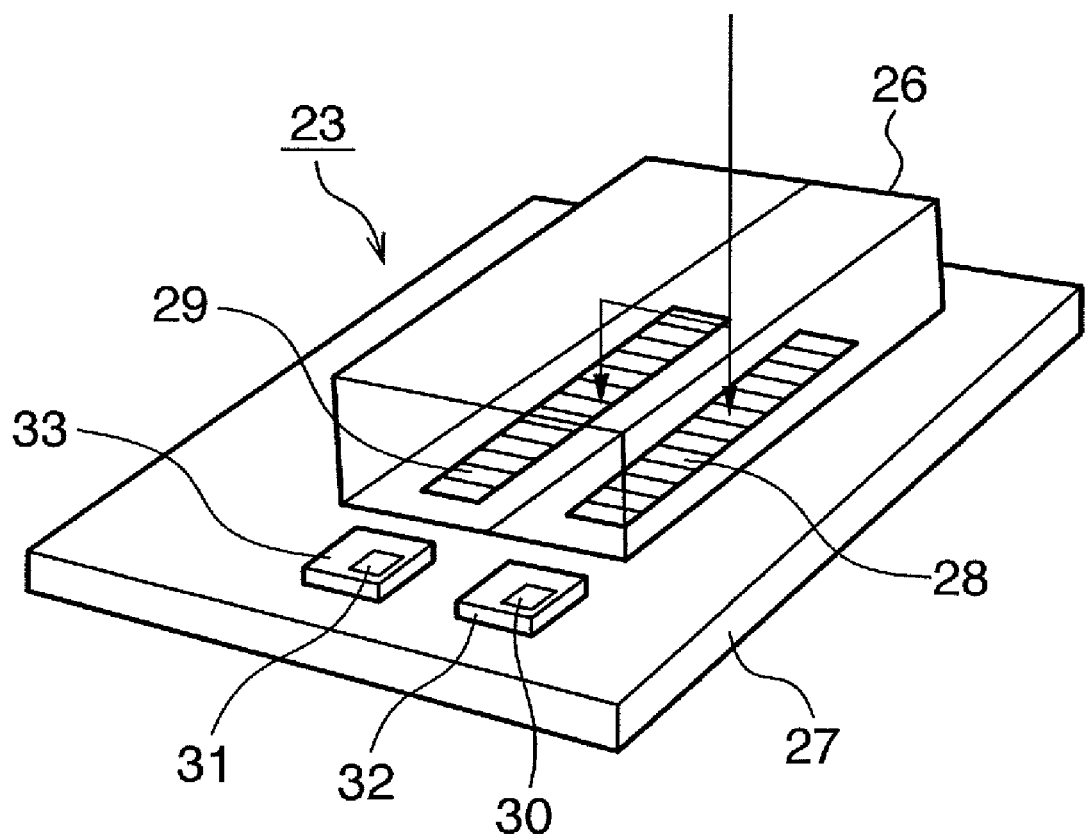
FIG. 13 is a perspective view for explaining the prior art.

FIG. 11 is a graph showing the relationship between the difference between light receiving output values, and the in-focus positional error of the photographing lens 101.

In FIG. 11, the abscissa axis represents the difference between the light receiving output values of the first and second light receiving portions 121*a* and 121*b*. The ordinate axis represents the in-focus positional error of the photographing lens 101 at the difference.

As described with reference to FIG. 4, each light receiving portion in the embodiment is divided into three light receiving regions. The difference between light receiving output values is the difference between corresponding light receiving regions of the respective light receiving portions. For example, when the focus detection region 131-1 is selected, the difference between light receiving output values in light receiving regions corresponding to the light receiving region 132-1, each out of the three light receiving regions of each of the first and second light receiving portions 121*a* and 121*b*, is calculated. In other words, the difference between light receiving output values in light receiving regions corresponding to a focus detection region is calculated.

In the graph of FIG. 11, a plot point 142 represents the difference between light receiving output values when a normal object is used to adjust the in-focus position of the photographing lens 101 under a reference light source in the manufacture of a camera. At this time, the focus position of the photographing lens 101 is so set as to be in focus in the image sensor unit 102. The detection result of the focus detection device 108 in this state is made to correspond to the difference between light receiving output values in the embodiment. The plot point 142 is plotted as an in-focus positional error of 0, as shown in FIG. 11.

A plot point 143 is plotted in accordance with the difference between light receiving output values and the in-focus positional error of the photographing lens 101 when the normal object is used under, for example, a fluorescent light. The light source for the plot point 143 may be one other than the fluorescent light, but is desirably a light source which is used popularly and exhibits a relatively large in-focus positional error.

It can be considered that the difference between light receiving output values is almost proportional to the in-focus positional error. Hence, a straight line 144 is drawn between these two plot points. The straight line 144 serves as a correction curve for the photographing lens 101 under various light sources.

For example, when an object is photographed under a light source which lies between the reference light source in adjustment and the fluorescent light, the accumulation operations of the first and second light receiving portions 121*a* and 121*b* simultaneously start in synchronism with the detection operation of the focus detection device 108, and simultaneously end after a predetermined accumulation time. The difference between the output values of the first and second light receiving portions 121*a* and 121*b* is calculated as D1. An in-focus positional error P1 of the photographing lens 101 is calculated as a correction amount from the correction curve 144. The correction amount P1 is added to the focus detection result of the focus detection device 108 to adjust the focus of the photographing lens 101. Satisfactory photography free from any focal error can be achieved under various light sources. In FIG. 11, the correction curve 144 is determined as a straight line from the two plot points 142 and 143. However, high-precision correction can be achieved by determining a correction curve as a quadratic or cubit curve using a plurality of light sources.

The light receiving unit 121 desirably receives light at the minimum F-number of the photographing lens 101 in order to improve the marginal performance at low luminance. Object defocus by the time lag can be prevented by executing the accumulation operation of each light receiving portion in synchronism with even the detection operation of the focus detection device 108.

The embodiment has exemplified only the photographing lens 101, but the present invention is also easily applicable to an interchangeable lens system. The focus detection photometry device 110 measures light diffused by the focusing screen 105. When the minimum F-number changes for each photographing lens, the light receiving outputs of the first and second light receiving portions 121*a* and 121*b* suffice to be stored and corrected for each minimum F-number, as is well known. This enables detection not only at the minimum F-number of the photographing lens but also at respective F-numbers.

The embodiment has not described the spectral characteristics of the image sensor and focus detection sensor on the assumption that the image sensor, focus detection sensor, and light receiving unit 121 have the same spectral characteristics. If these elements have different spectral characteristics, the spectral transmittance of each filter is determined in consideration of the respective spectral characteristics.

In the spectral transmittance graph shown in FIG. 8, the wavelength width of light becomes narrow. However, when the first and second light receiving portions have a difference along the ordinate axis representing the spectral transmittance, an area considering even the ordinate axis represents energy applied to the light receiving portion regardless of the wavelength width.

As has been described above, the embodiment can measure the spectral state of an object more accurately than in the prior art even at low luminance. This can implement high-precision focus detection.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-304411, filed on Nov. 9, 2006, which is hereby incorporated by reference herein in its entirety.

What is claimed is:

1. A photometry apparatus comprising:

a diffusing optical member which is inserted in an optical path of a photographing lens and has a diffusing surface creating multiple diffused light paths at different angles with respect to an optical axis; and a light receiving unit configured to receive diffused light having passed through the diffusing surface, said light receiving unit configured to have a first light receiving portion and a second light receiving portion whose spectral transmission characteristics are different with each other, wherein a receivable spectral light energy of the second light receiving portion is smaller than a receivable spectral light energy of the first light receiving portion, wherein the first light receiving portion and the second light receiving portion are so arranged so to make the second light receiving portion receive incident light diffused at a smaller angle with respect to the optical axis than the diffused light incident upon the first light receiving portion thereby making a parallax of the second light receiving portion with respect to the optical axis of the photographing lens smaller than a parallax of the first light receiving portion.

2. The apparatus according to claim 1, wherein the first light receiving portion and the second light receiving portion are formed on the same element.

3. A camera comprising:
  a diffusing optical member which is inserted in an optical path of a photographing lens and has a diffusing surface creating multiple diffused light paths at different angles with respect to an optical axis; and
  a light receiving unit configured to receive diffused light having passed through the diffusing surface, said light receiving unit configured to have a first light receiving portion and a second light receiving portion whose spectral transmission characteristics are different with each other, wherein a receivable spectral light energy of the second light receiving portion is smaller than a receivable spectral light energy of the first light receiving portion,
  wherein the first light receiving portion and the second light receiving portion are so arranged so to make the second light receiving portion receive incident light diffused at a smaller angle with respect to the optical axis than the diffused light incident upon the first light receiving portion thereby making a parallax of the second light receiving portion with respect to an optical axis of the photographing lens smaller than a parallax of the first light receiving portion.

4. The camera according to claim 3, wherein the first light receiving portion and the second light receiving portion are formed on the same element.

5. The camera according to claim 3, further comprising switching unit configured to switch light from the photographing lens between a state in which the light is guided to an optical path extending to an image sensing plane for sensing an object image formed by the photographing lens, and a state in which the light is guided to an optical path extending to a viewfinder for observing an object image by the photographing lens,
  wherein said light receiving unit is inserted in the optical path extending to the viewfinder.

6. The camera according to claim 5, wherein a field of view of the viewfinder in the optical path extending to the viewfinder is substantially a rectangle, and said light receiving unit is so arranged as to receive the diffused light outside an effective light beam along a short side of the rectangle.

7. The camera according to claim 3, further comprising:
  focus detection unit configured to detect a focusing state of the photographing lens; and
  correction unit configured to correct a detection result of said focus detection unit in accordance with an output from said light receiving unit.

* * * * *